(12) United States Patent
Bastian, II et al.

(10) Patent No.: US 6,650,225 B2
(45) Date of Patent: Nov. 18, 2003

(54) WIRELESS DIRECTED INVENTORY SYSTEM

(75) Inventors: William A. Bastian, II, Carmel, IN (US); Hussam Alibrahim, Prospect, KY (US)

(73) Assignee: ASAP Automation, LLC, Louisville, KY (US)

( * ) Notice: Subject to any disclaimer, the term of this patent is extended or adjusted under 35 U.S.C. 154(b) by 59 days.

(21) Appl. No.: 09/734,360

(22) Filed: Dec. 11, 2000

(65) Prior Publication Data

US 2002/0070846 A1 Jun. 13, 2002

(51) Int. Cl.$^7$ ................................................ G06F 7/00
(52) U.S. Cl. .................. 340/5.92; 340/5.9; 340/825.52; 705/28; 705/29
(58) Field of Search .............................. 705/22, 28, 29; 340/10.4, 5.92, 825.49, 5.9, 825.52

(56) References Cited

U.S. PATENT DOCUMENTS

| | | | |
|---|---|---|---|
| 3,532,184 A | 10/1970 | Blake | 186/1 |
| 3,716,697 A | 2/1973 | Weir | 235/61.9 R |
| 3,739,339 A | 6/1973 | Hillhouse et al. | 340/147 A |
| 3,770,941 A | 11/1973 | Gechele et al. | 235/61.7 R |
| 3,908,800 A | 9/1975 | Drapeau | 186/1 |
| 4,237,598 A | 12/1980 | Williamson | 29/518 |
| 4,332,012 A | 5/1982 | Sekine et al. | 364/418 |
| 4,346,453 A | 8/1982 | Drapeau et al. | 364/900 |
| 4,419,734 A | 12/1983 | Wolfson et al. | 364/567 |
| 4,521,677 A | 6/1985 | Sarwin | 235/385 |
| 4,598,272 A * | 7/1986 | Cox | 340/539 |
| 4,598,459 A | 7/1986 | Klink et al. | 29/564.8 |
| 4,625,396 A | 12/1986 | Ahmed et al. | 29/701 |
| 4,646,245 A | 2/1987 | Prodel et al. | 364/468 |
| 4,669,047 A | 5/1987 | Chucta | 364/468 |
| 4,821,197 A | 4/1989 | Kenik et al. | 364/468 |
| 4,827,395 A | 5/1989 | Anders et al. | 364/138 |
| 4,942,534 A | 7/1990 | Yokoyama et al. | 364/468 |
| 5,029,095 A | 7/1991 | Kenik et al. | 364/468 |
| 5,097,421 A | 3/1992 | Maney et al. | 364/478 |
| 5,412,576 A | 5/1995 | Hansen | |
| 5,414,634 A | 5/1995 | Morgan et al. | |
| 5,505,473 A | 4/1996 | Radcliffe | 280/79.2 |
| 5,528,232 A * | 6/1996 | Verma et al. | 340/825.54 |
| 5,742,238 A | 4/1998 | Fox | 340/825.49 |
| 5,781,443 A | 7/1998 | Street et al. | 364/478.02 |
| 5,793,963 A | 8/1998 | Tapperson et al. | 395/200.31 |
| 5,798,693 A * | 8/1998 | Engellenner | 340/505 |
| 5,812,986 A * | 9/1998 | Danelski | 705/22 |
| 5,875,434 A | 2/1999 | Matsuoka et al. | 708/28 |
| 5,892,441 A * | 4/1999 | Woolley et al. | 340/539 |
| 6,108,367 A * | 8/2000 | Herman et al. | 375/141 |

OTHER PUBLICATIONS

Light directed Pick (LDP) User Guide for Gage Marketing effective Apr. 5, 2000, ASAP Automation, Inc. 18 pages.
ASAP Warehouse Management Software "Exacta" Automation for Supply Chain Logistics, 23 pages.
7000 Series Ultimate Man–Machine Distribution System, 2 pages.
ROK 101 007 Bluetooth Module by Ericsson, 11 pages.
Bluetooth Radio Specification, Part A, 11 pages.

(List continued on next page.)

*Primary Examiner*—Michael Horabik
*Assistant Examiner*—M Shimizu
(74) *Attorney, Agent, or Firm*—Woodard, Emhardt, Moriarty, McNett & Henry LLP

(57) ABSTRACT

A directed inventory system uses individual wireless pick-to modules, or individual wireless pick-from modules, or both, to aid inventory management services such as order fulfillment. Modules wirelessly receive servicing information directly from a processing computer, and transmit servicing status information directly to the computer. Light indicators or display panels on the modules provide information corresponding to a service to be performed, such as a quantity of parts to be picked from a bin, a location of a parts bin to pick from, a designation of a container to pick into, or other servicing information.

10 Claims, 7 Drawing Sheets

OTHER PUBLICATIONS

RFID solutions from symbol Technologies, Application Brief dated Nov. 1999, 1 page.

Kooser, Amanda C., "It's in the Air Laptops and palmtops talking without wires? It's Bluetooth inside.", *Entrepreneur* Jul. 2000, 1 page.

Internet printout Jul. 13, 2000, IPCI Innovative Picking Technologies, Inc., "Snap–in" BUS, 1 page.

Internet printout Jul. 13, 2000, IPCI Innovative Picking Technologies, Inc., "System Operation," 1 page.

Internet printout Jul. 12, 2000, Order Picking systems Pick–To–Trolley System, 1 page.

Internet printout Jul. 12, 2000, Order Picking systems, "RackRunner Order Picking System", 1 page.

Internet printout Jul. 6, 2000, Advanced Tracking System "IridNet", 1 page.

Internet printout Jul. 13, 2000, Accupic Pick–to–light, 1 page.

Internet printout Jul. 11, 2000, Sourcewire.com, symbol wireless Technology Selected for J.C. Penney State–of–the–Art Distribution Center, 1 page.

Internet printout Jul. 10, 2000, Catalyst Warehouse Management Systems, 2 pages.

Internet printout Jul. 13, 2000, Eli Lilly & Company Key system Technologies, 1 page.

Internet printout Jul. 13, 2000, Accupic Mobile Bath Pick Carts, 1 page.

Internet printout Jul. 13, 2000, Carton Flow Pick–to–Light systems: A Simulation Analysis for Batch vs. Single Order Pick Methodologies, 4 pages.

Internet printout Jul. 13, 2000, Data Control Systems, Inc. "CartRite" Mobile RF–Cart/Batch Picking System, 2 pages.

Internet printout Jul. 10, 2000, Automation Associates, AAI Warehouse Management System, 1 page.

Internet printout Jul. 10, 2000, Intellitrack RF, 1 page.

Inter printout Jul. 11, 2000, RFID Solutions from Symbol Technologies, 2 pages.

Internet printout Jul. 10, 2000,e–Warehouse, The RF/PC Module, 1 page.

Internet printout Jul. 13, 2000, Radio Frequency Data Communications (Overview) 3 pages.

Internet printout Jul 10, 2000, Majure Data OnLine, RF Navigator, 1 page.

Internet printout Jul. 10, 2000, Automation Associates, Spectrum24 High–Performance Wireless LAN, 2 pages.

* cited by examiner

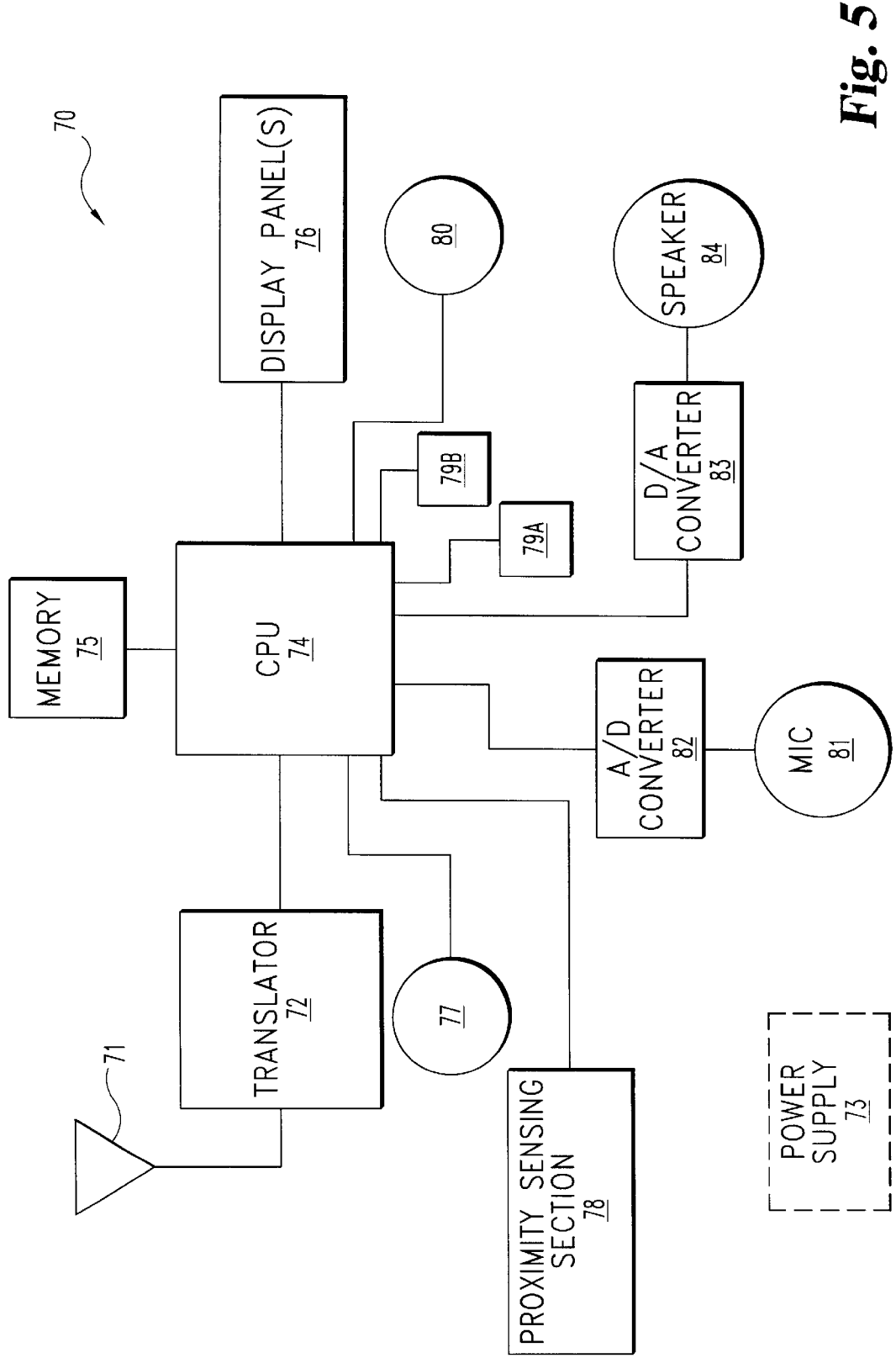

WIRELESS DIRECTED INVENTORY SYSTEM

BACKGROUND OF THE INVENTIONS

1. Field of the Inventions

The present invention relates generally to directed inventory systems and more specifically to light directed inventory systems using wireless pick-to modules or wireless pick-from modules, or both.

2. Related Art

Traditional paper based order fulfillment systems involve using a printed "picking ticket" having a number of line items arranged according to customer priority. In such a system, the order operator is required to read a line item from the picking ticket and go to the appropriate bin location. After verifying the proper bin location, the order operator reads from the paper picking ticket the quantity required for the line item and picks the required units from the bin. After which the operator must mark on the picking ticket the quantity picked for inventory purposes. Traditional paper-based systems, as described above, are prone to pick errors primarily created through the operator's back-and-forth eye movement from paper to pick location. On orders with multiple line items, the quantity to pick can sometimes be confused with an adjacent order.

Light directed inventory systems are known in the art for improving the efficiency of inventory management procedures, such as order fulfillment. In a basic form, a light directed picking system replaces a paper picking system by directing an operator to an appropriate parts bin using computer-controlled sequenced lighting. For example, a visual indicator may light adjacent a bay, bin or carousel where items are to be picked. An operator locates the desired bay, bin or carousel by visually scanning the area for the signal lights. Some systems presently on the market additionally include an indicator on the bay, bin or carousel that visually indicates to the picker the number of items to be picked. Such systems have been physically wired over long distances from the bin location to a main computer control system for control of the light directed displays and for inventory control.

Other systems have utilized radio frequency (RF) to allow a wireless processor panel to communicate with a plurality of picking modules wired thereto, thus eliminating some wired connections. For example, U.S. Pat. No. 5,812,986 to Danielski is directed towards an RF light directed inventory system including a host computer, a host RF transmitter/receiver, at least one RF processor panel, and a plurality of light directed modules. In the Danielski patent, a plurality of light directed module addresses, item quantities and RF processor panel addresses are converted into a plurality of serial data packets and transmitted to one RF processor panel. The serial data packet is input by the RF processor panel and decoded into a plurality of light directed module addresses and item quantities. The item quantities will be displayed on each light directed module. U.S. Pat. No. 5,812,986 to Danielski is incorporated herein by reference.

There is a need for a system that improves the accuracy and efficiency of directed inventory systems by utilizing individual wireless "pick-to" modules to better direct an order operator to a picking location. Further, there is a need to reduce operator errors once the operator has arrived at a picking location.

There is also a need for a system that more advantageously improves directed inventory systems by reducing the number of wired connections thereby having, among other advantages, improved flexibility of potential configurations, reduced installation and maintenance costs, and reduced problems associated with wired communication circuitry such as voltage transients and ground-loop currents.

These needs and others are satisfied by Applicant's present inventions described herebelow.

SUMMARY OF THE INVENTIONS

It is an object of the present invention to provide a directed inventory system comprising a computer, a communicator that communicates with the computer and which directly communicates with one or more individually addressable wireless modules.

The inventory system of the present invention can include wireless pick-to modules, wired or wireless pick-from modules, or any combination thereof. In some forms of the invention, the modules can include light indicators or display panels that display servicing information transmitted from the computer. If desired, in some forms of the invention, the modules can also include buttons for acquiring servicing status information which is transmitted to the computer.

Further objects and advantages of the present invention will be apparent from the accompanying drawings and description.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout.

FIG. 5 is a block diagram of a remote wireless device useful with the present inventions.

DETAILED DESCRIPTION OF THE PREFERRED EMBODIMENTS

Figure 1:
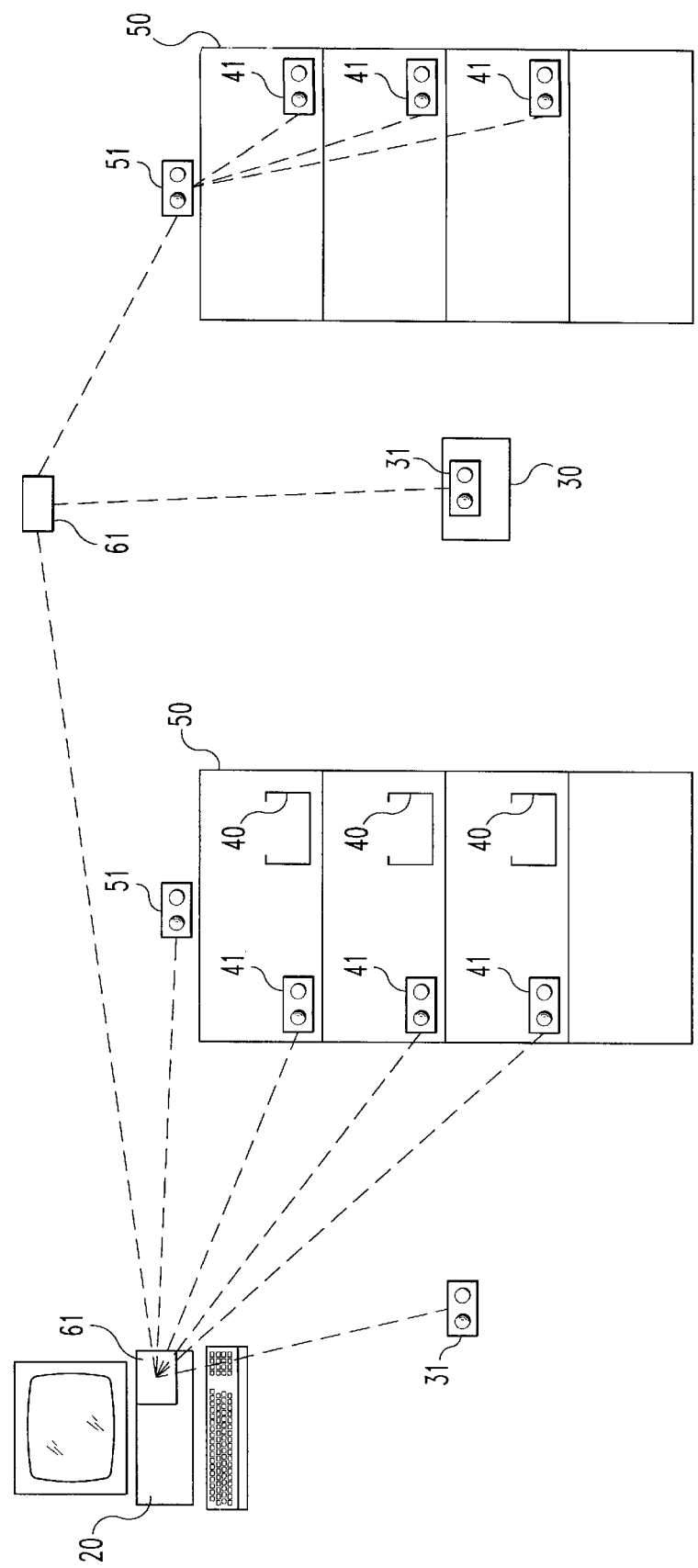
FIG. 1. shows a directed inventory system in accordance with the present inventions.

Referring now to FIG. 1, there is shown a directed inventory system in accordance with one embodiment of the present invention comprising a computer 20, access point 22, and at least one wireless module. Customer orders are entered into computer 20 and automatically compiled according to a predefined priority scheme. Computer 20 wirelessly communicates servicing information directly to "pick-to" module 31 which is typically portable and carried by an operator. Note that in the present application "operator" refers to one who performs a service; e.g. a person who picks parts to fulfill an order. "Service" refers to any of various procedures including picking parts from a bin, putting parts into a bin, counting parts in a bin, inspecting a bin or any parts therein, performing maintenance on a bin or any equipment associated therewith, or other inventory and equipment management procedures. Bin is used herein interchangeably with bin, shelf and/or drawer location. Note that even when a particular service involves a task other than the picking of parts, module 31 is nonetheless described herein as a "pick-to" module and module 41 is described herein as a "pick-from" module.

Pick-to module 31 then alerts the operator of the occurrence of a servicing task. Depending on the form of the pick-to module 31, as will be described below in connection with FIGS. 2A–2G, the pick-to module may supply the operator with additional servicing information, such as the location of the service to be performed and/or the quantity of items to be picked.

Pick-to module 31 may be carried by, strapped to the wrist of, or clipped to the clothing of an operator. If a picking container 30 is used, pick-to module 31 may be detachably mounted on picking container 30. Similarly, pick-to module 31 may be permanently affixed or integral to picking container 30 or affixed to a cart which may or may not have a picking container 30 placed thereon. Multiple pick-to modules, each independently capable of wirelessly communicating directly with computer 20, may be affixed to a cart or affixed to individual containers on a cart.

The embodiment of FIG. 1 also includes a plurality of "pick-from" (or "pick-here") modules 41, each associated with a particular servicing location; e.g. a parts bin from which parts are to be picked. Computer 20 transmits servicing information to a designated pick-from module 41 with which a particular service is associated. The so designated pick-from module 41 is also referred to herein as a "target" pick-from module. The target pick-from module then displays information which aids an operator in performing the service. For example, depending on the form of pick-from module 41 chosen, as will be described more completely in connection with FIGS. 3A–3G, the target pick-from module can display a quantity of parts to be picked from a parts bin 40 associated therewith.

Pick-from modules 41 each directly communicate wirelessly with access point 22. Note that "communicate" throughout the present application refers to transmitting information or receiving information or both. In some forms of the invention, some modules are configured to transmit or receive information, but not both. Particularly, modules that acquire information (e.g. from a button) are configured to at least transmit information. Whereas modules with a display are configured to at least receive information. "Display" refers to any device, including light indicators and display panels, capable of displaying information. Wireless communication in the present system preferably uses a digital spread-spectrum frequency hopping technique, such as the Bluetooth standard. Alternately, other wireless communication techniques can be used, such as infrared or other forms of RF. "Direct communication", "directly communicating", or "communicating directly" refers to communication wherein information is communicated to the wireless communication section of an individually addressable module from any unit not physically wired thereto. For example, if computer 20 communicates with pick-from module 41 without any physical wired connection between the computer 20 and pick-from module 41 or between at least a retransmitting module (such as access point module 61) and pick-from module 41, computer 20 is "directly" wirelessly communicating with pick-from module 41. Among other advantages, direct communication improves configurability and reduces circuitry.

In the embodiment of FIG. 1, preferably, pick-from module 41 is detachably mounted on parts bin 40. A plurality of parts bin 40 are preferably located on racks or shelves of bay 50. Bay 50 may be a stationary shelving unit or may be a tower of moving carousels. Optionally, pick-from module 41 may be permanently affixed or integral to parts bin 40 or may be mounted on a shelf in bay 50, and parts bin 40 can be placed on the shelf. The use of parts bins is not meant to limit the present invention; physical parts bins may be omitted in some instances or entirely and the pick-from module located on the shelving unit.

FIG. 1 additionally shows a bay activity module 51 which is associated with a plurality of pick-from modules 41. Typically, bay activity module 51 is placed in a highly visible location (e.g. on or near the top of a bay 50) so that an operator may be directed to the proper bay, even if some of the pick-to modules 41 in the bay may not always be visible to an operator. Bay activity module 51 may be omitted, if desired.

Further, in FIG. 1 there are shown two access point modules 61. Access point module 61 is configured to receive and retransmit information directly to and from computer 20 and other system modules. Preferably, access point 61 is configured to amplify any retransmitted information. Optionally, access point 61 can be configured to recondition (e.g. by filtering) retransmitted information. Multiple access point modules 61 can be used to advantageously improve potential range, reliability, and redundancy in wireless communication systems. In some forms, access point module 61 is configured for relatively high power communications (e.g. as characterized by a Bluetooth class 1 device). Such forms potentially allow other system modules to be configured for relatively lower power communications. Configuring access point module 61 for relatively higher power communications also potentially allows increasing the physical range of an inventory system and potentially increases communications reliability. In some forms, access point module 61 and some system modules (e.g. bay activity modules 51) are configured for relatively high power communications, whereas other system modules are configured for relatively lower power communications (e.g. pick-to module 31 and pick-from modules 41). Similarly, the communication section of a pick-to module could be configured for relatively longer range, higher power communications (e.g. having a range of 100 meters and power rating of 100 mW as characterized by a Bluetooth class 1 device), while the communication section of a pick-from module could be configured for relatively short range communications (e.g. having a range of 10 meters and power rating of 1 mW, as characterized by a Bluetooth class 3 device). Using various modules to communicate with other modules allows a system to function as a form of wireless network or distributed control system.

A plurality of access point modules 61 may be used depending on the conditions under which the system has to work (e.g. locations having interfering RF sources). At least one access point module 61 directly communicates with computer 20. Access point module can be configured to communicate with computer 20 in a variety of ways: e.g. connected to an external I/O port (such as a parallel, serial, or USB port), plugged into an existing bus slot (such as a PCI or ISA slot), connected to a device (such as a network adapter or modem) which itself is connected to an I/O port or bus slot, or by other means known in the art. Additional access point modules (if any) may also directly communicate with computer 20 or may communicate with computer 20 through other access modules. FIG. 1 illustrates a first access point module 61 directly communicating with computer 20, and a second access point module 61 wirelessly communicating with computer 20 through the first access point module. In some systems made in accordance with the present invention, multiple access point modules directly communicate with computer 20. In such systems, computer 20 could communicate with access point modules through a wireless or wired network—such as an Ethernet network—to which some or all of the access point modules are also connected. In a preferred form, computer 20 includes a network card connected to a wired network, and all access point modules in the system are connected to the wired network: the access point modules are positioned on the network so as to achieve the desired physical coverage of the inventory system.

Additionally, if a system employs a wireless communications protocol which only permits communication with a certain number of wireless devices, access point modules 61 can be configured for virtual (or "logical") addressing to increase the number of wireless devices in the system. As an example of such a system, each wireless device (e.g. pick-to, pick-from, or bay activity module) has a physical address and an associated virtual (or "logical") address. The physical address is integral to the device; e.g. contained in a ROM, dipswitches, or the like. The virtual address is mapped (e.g. in a lookup table) to a particular wireless device associated with an access point. Thus in such a system, information transmitted by computer 20 contains the virtual address of the recipient wireless module. Access point 61 decodes the virtual address into a physical address; if the recipient module is one of its associated modules, access point 61 retransmits the information to the recipient module. Thus, even if a particular communications protocol limits the number of physical addresses (e.g. the current Bluetooth standard allows 8 devices per subnet), virtual addressing allows a system to addresses devices beyond that limit. In a preferred embodiment, an inventory system in accordance with the present invention uses virtual addressing.

Other systems made in accordance with the present inventions may not use any access point modules due to the small physical size of the systems or the lack of interfering sources.

Figure 2A:
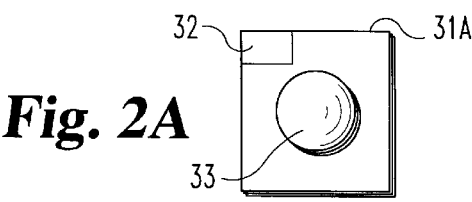
FIGS. 2A–2G show various forms of pick-to modules.

FIGS. 2A–2G illustrate some examples of various forms of pick-to modules 31 that may be used in connection with embodiments of the present inventions which include pick-to modules. Referring now to FIG. 2A, in its most basic form, a pick-to module 31A comprises a communication section 32 and a light indicator 33. Light indicator 33 includes at least one light-producing device such as a light emitting diode (LED) or an incandescent bulb. When a service is to be performed, computer 20 wirelessly transmits information via communicator 22 (and, if needed, at least one access point module 61) directly to communication section 32 on pick-to module 31A. Communication section 32 comprises circuitry for wirelessly communicating with communicator 22. Preferably the communications circuitry includes an integral antenna, although alternate forms can employ other antenna configurations as known to those in the art. A processor within the pick-to module 31A processes the received information and sends a signal which turns on the light indicator 33. In the present embodiment, the operator would visually scan the bays or carousels (50 of FIG. 1) for another indicator and/or more information regarding the service. If used, the pick-to indicator 31 of 2A need only include a receiver section, as no information is transmitted from the pick-to module 31A to the computer (20 of FIG. 1).

Figure 2B:
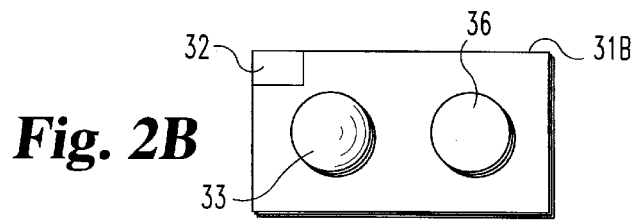

In FIG. 2B there is shown a pick-to module 31B, which is similar in many respects to that described in connection with pick-to module 31A. However, the pick-to module 31B further includes a service complete button 36. After the operator has completed the service indicated by the lighting of light indicator 33, the operator pushes the service complete button 36. A signal is then sent to the computer 20 (possibly via the access point module 61) from the pick-to module, indicating that the service was completed. In such an embodiment the pick-to module 31B would be required to have both receive and transmit capabilities.

Figure 2C:
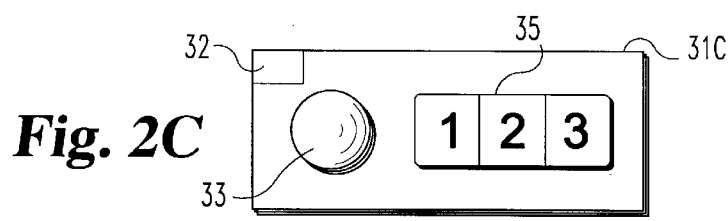

In FIG. 2C there is shown a pick-to module 31C similar to that of FIG. 2A, but further including a display panel 35C. Display panels of the present invention display at least part of the transmitted information, for example a quantity to be picked, the SKU number of a parts bin, the location of a bin, a designation of a bay where a bin is located, or any combination of the transmitted information. In some forms wherein one pick-to module is associated with multiple picking containers (e.g. multiple order picking), the display panel can indicate which container to service (e.g. pick from or pick into). Additionally, more detailed information can be transmitted; such as routing information to a parts bin or other instructions to the operator. The display panel 35C of FIG. 2C gives, as an example, the number of items to be picked from a bin. Display panel 35C is preferably an LCD display or a multi-digit LED display panel.

Figure 2D:
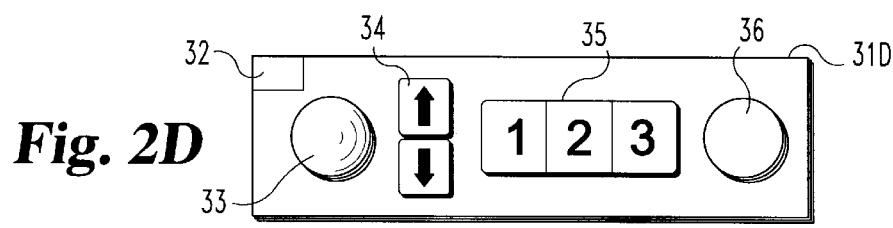

FIG. 2D shows a pick-to device 31D, similar to pick-to device 31C, but additionally including the service complete button 36 and adjustment buttons 34. Adjustment buttons 34 can be used by the operator to enter the actual pick count taken from the bin prior to pushing service-complete button 36. This information is relayed back to the computer 20 via the communicator 22 (and optionally, one or more access point modules 61) to be used for inventory purposes. Alternately, if fewer items were picked than indicated, the computer 20 could redirect the operator to the location of a substitute item. The adjustment buttons 34 are preferably configured to withstand environmental conditions such as dust and moisture.

Figure 2E:
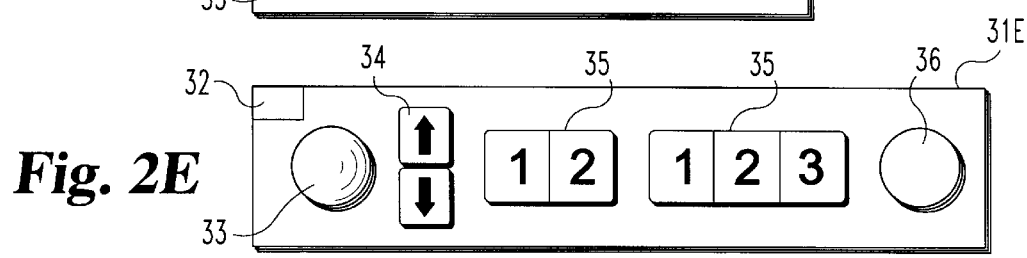

In FIG. 2E there is shown a pick-to module 31E similar in most ways to pick-to module 31D, but further including a second display 35E for displaying a further portion of the information transmitted from the computer (20 of FIG. 1). In the present example shown, the display 35E indicates the bin location from which the quantity of items indicated on display panel 35C are chosen. Note that other information may be displayed on the display panels 35C and/or 35E. Further, it is important to note that if an LCD display is used, both display panel 35C and 35E could be included on the same LCD display panel, as well as other display areas if desired.

Figure 2F:
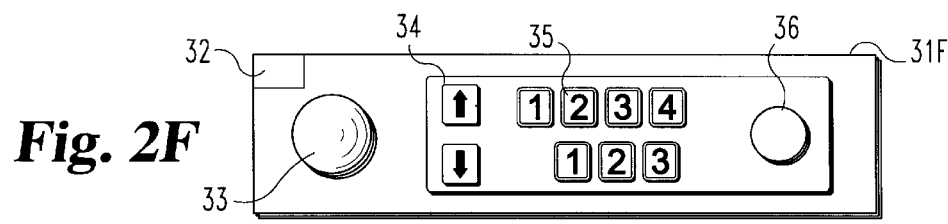

Referring now to of FIG. 2F, there is shown a further alternate embodiment of the pick-to module (31 of FIG. 1). The pick-to module 31F is similar in function and operation to pick-to module 2E. However, display panel 35F comprises a touch screen which can be configured to include service complete button, adjustment buttons, or other buttons, as touch screen functions.

Figure 2G:
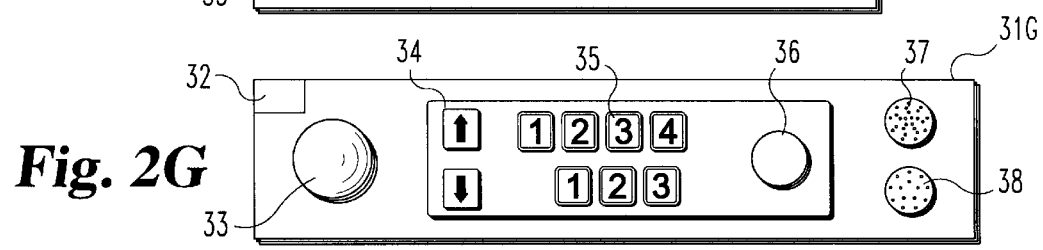

In FIG. 2G there is shown a preferred from of pick-to module 31G that is similar to the pick-to module of FIG. 2F. However, the pick-to module 31G further includes a speaker 37, and a microphone 38, but does not include light indicator 33. In the form of FIG. 2G, an operator is alerted by information displayed on display panel 35F (or by optional backlighting of display panel 35F) rather than by activation of a light indicator. Nonetheless light indicator 33 and display panel 35F can both be included on the same module (as with FIG. 2F) when so desired: for instance, when ambient lighting conditions might wash-out the display of display panel 35F from certain viewing angles. In a preferred form, display panel 35F is a color LCD panel capable, although a monochromatic display may also be used. In a preferred form, panel 35F is capable of displaying text and graphics, although a text-only display may also be used.

Still referring to FIG. 2G., the speaker and microphone permits clear "real time" bi-directional audio data communication between the operator and a dispatcher. Note that the pick-to module may, if desired, incorporate only one of a speaker or microphone to provide uni-directional audio signals to or from the operator. Similarly, in connection with any of the above configurations, a speaker 37 or auditory alarm may be provided instead of or in addition to the light indicator 33 to indicate to an operator that a service is to be performed. The addition of such an auditory alarm would be advantageous if, for example, multiple pick-to modules and picking containers were used by one operator (e.g. multiple order picking), an auditory alarm indicating which container to service (e.g. pick into or pick from) may provide a faster cue then would a visual signal. Instead of, or in addition to an auditory alarm, a more detailed audio signal—e.g. prerecorded or computer-generated voice messages—may be transmitted to and reproduced by speaker 37. In a preferred form, both audio and visual indicators are used.

Figure 3A:
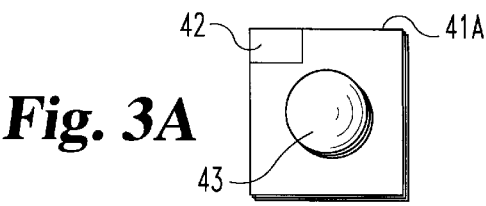
FIGS. 3A–3G show various forms of pick-from modules.

FIGS. 3A–3G illustrate some examples of various forms of pick-from modules 41 that may be used in connection with embodiments of the present inventions. As can be seen, the pick-from modules of FIGS. 3A–3G are similar to the pick-to modules of FIGS. 2A–2F. Referring now to FIG. 3A, in its most basic form, pick-from module 41A includes a communication section 42 and a light indicator 43. As discussed above in connection with the pick-to modules, any of the pick from modules may optionally include a speaker (such as speaker 37 of FIG. 2G) or auditory alarm instead of or in addition to the light indicator 43 providing an audible indication to an operator to help the operator more efficiently locate the appropriate picking location. As with light indicator 33, light indicator 43 includes at least one light-producing device such as an LED or an incandescent bulb. When a service is to be performed, computer 20 wirelessly transmits information via communicator 22 (and, if needed, at least one access point module 61) to communication section 42 on pick-to module 41A. A processor within the pick-from module 41A processes the received information and sends a signal which turns on the light indicator 43. The operator than scans the bins until locating the desired bin having indicator light 43 lit. As with FIGS. 2A–2G, the pick-from modules 41A–41F of FIGS. 3A–3G may be chosen to include additional components, such as adjustment buttons 44, a service complete button 46 and information displays 45C and 45E, the operation of which would be substantially the same as described in connection with the items of the same name in FIGS. 2A–2G.

Figure 3B:
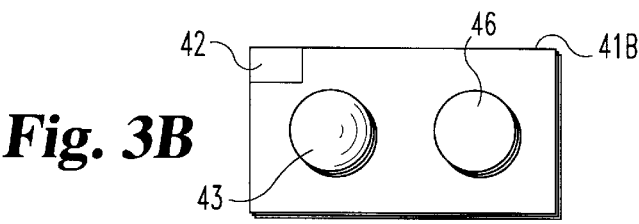
Figure 3C:
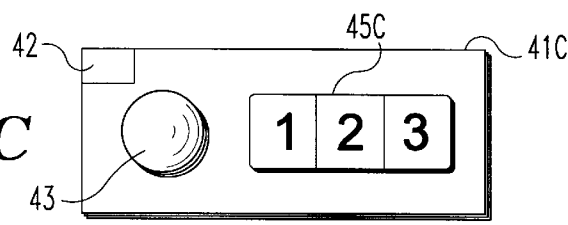
Figure 3D:
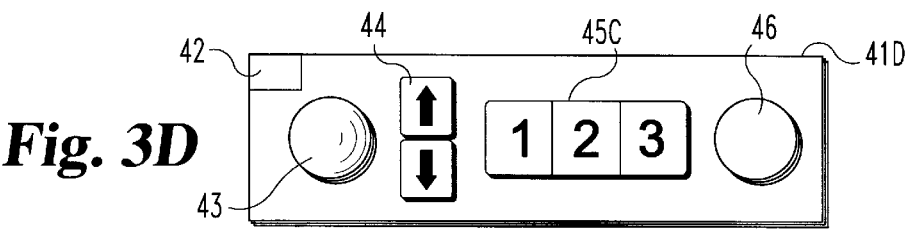
Figure 3E:
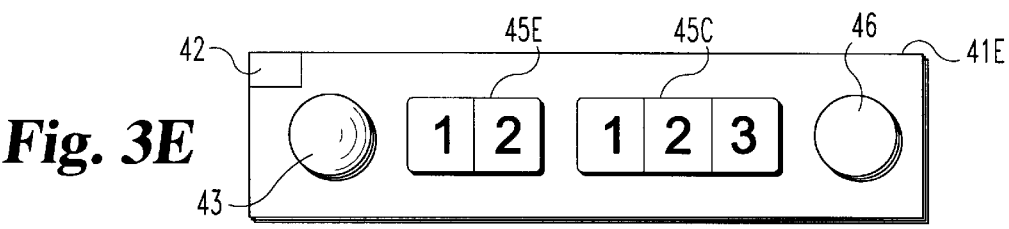
Figure 3F:
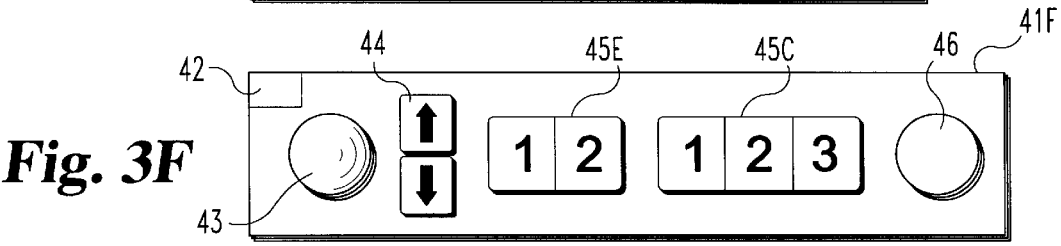

Additionally, any of the pick-from modules 41A–41G may optionally include a proximity sensor such as proximity sensing section 47 shown in connection with the pick-from module 41F of FIG. 3f. The proximity sensing section, if used, is designed to sense an operator's hand picking in a location. This information may be relayed back to the computer (20 of FIG. 1) via the communication section 42 for various inventory and operator tracking purposes. A proximity sensing section may also be included in any form of pick-to or pick-from module.

Figure 3G:
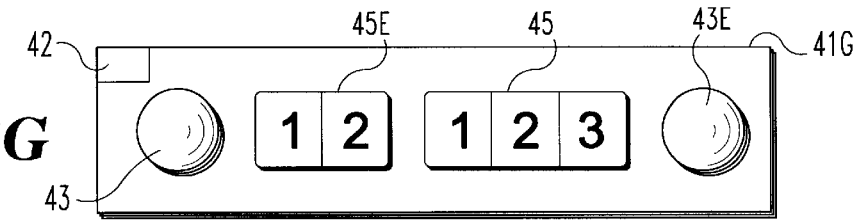

Referring now more specifically to FIG. 3G, there is shown a pick-from module 41G including a communication section 42, a first light indicator 43, and display panels 45C and 45E. The pick-from module 41G additionally includes a second light indicator 43G. Such a pick-from module 41G is useful in an embodiment of the present invention utilizing a light tower located between two carousels or conveyors. As such, the pick-from module 41G is not mounted to a shelf or bin, but is mounted in a vertical array of pick-from modules 41G between two adjacent tower carousels at a point in the carousel where only a single tower from each carousel is brought adjacent to the light tower. For example, in a tower carousel system having 30 towers, each tower consisting of 10 vertically stacked bins or vertical shelves, there will be located between two such carousels a tower of 10 vertically stacked pick-from modules 41G to indicate from which tower and bin/shelf the desired item is to be removed. The light tower pick-from modules 41G visually directs the operator to the correct carousel shelf level and cell while displaying pick quantity. Additionally, in a two carousel system the dual light indicators 43 and 43G indicate from which of the two carousels (the left or right carousels) to pick. In such an embodiment the operator remains stationary and the carousels are operated to bring the desired shelf or bin in front of the operator. If desired, a display panel 45C may indicate the desired quantity of items to pick. Adjustment buttons 44 and a service complete button 46 may additionally be used in connection with the embodiment of FIG. 3G, if desired.

Referring back to FIGS. 3A–3G, although not shown, if desired, a microphone and/or speaker may be incorporated into any of the pick-from modules 41A–41G. Additionally, any of the pick-from modules 41C–41G may include a touch sensitive display panel which incorporates some or all of the functionality of adjustment buttons 44, first and second display panels 45C and 45E and the service complete button 46. Note that if choosing a pick-from module which includes return path information, such as the number of actually picked items entered using adjustment buttons 44, service complete information using the service complete button 46, and or information sensed by a proximity sensing section, then communication section 42 must similarly include transmit capability as well as receive capability. Additionally, in embodiments using both pick-to and pick-from modules, those modules may be chosen to have different forms. For example, if desired, the pick-to module of FIG. 2E may be used in a system using at every picking location the pick-from module of FIG. 3A. However, this example is not meant to be limiting, as pick-to modules and pick-from modules having the same or various combinations of different components may be used in a system in accordance with the present inventions.

Figure 4A:
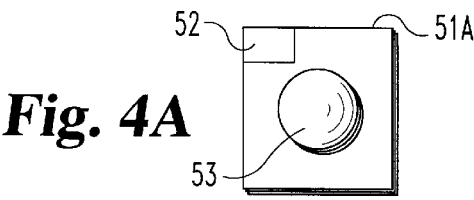
FIGS. 4A–4F show various forms of bay activity modules.
Figure 4B:
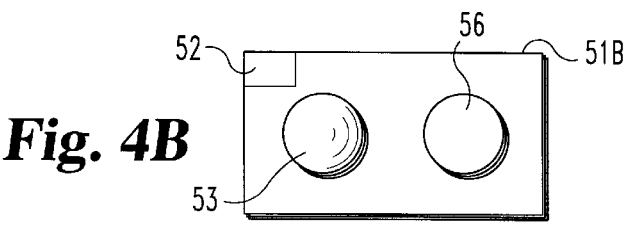
Figure 4C:
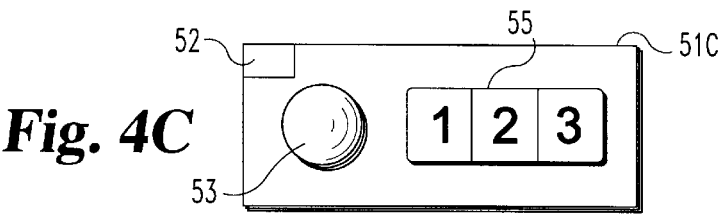
Figure 4D:
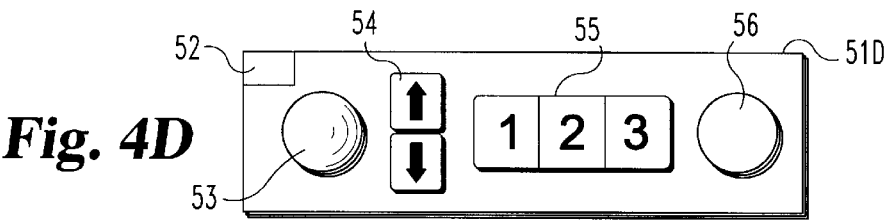
Figure 4E:
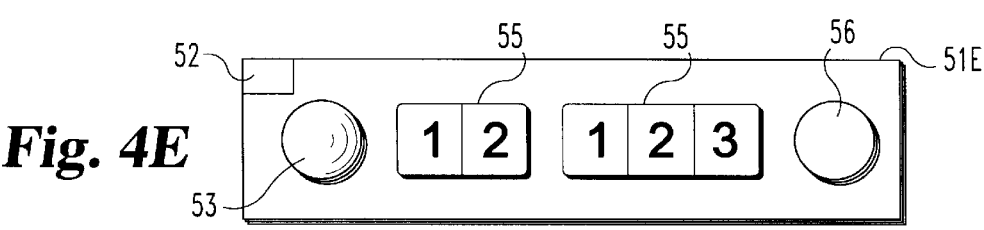
Figure 4F:
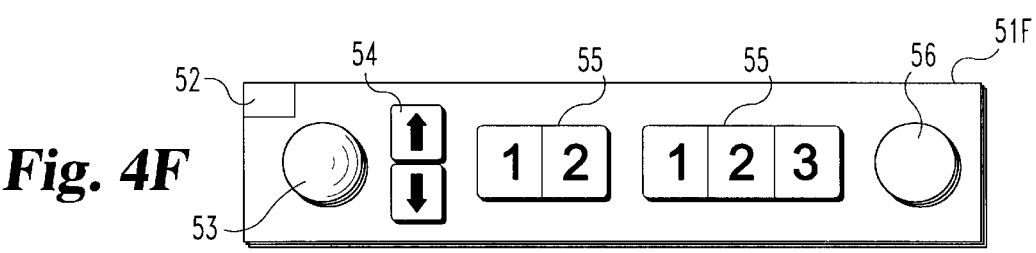

Referring now to FIGS. 4A–4F, there are shown a sampling of possible wireless bay activity modules 51A–51F useful with the present inventions. As described in connection with bay activity module 51 of FIG. 1, bay activity module 51 is mounted on a bay comprising a plurality of shelves or other storage locations, the bay having a plurality of pick-from modules 41 associated therewith. The wireless bay activity module sits on top of a bay of bins or shelves to more clearly indicate to an operator from a distance which bay contains items to be picked. Referring more specifically to FIG. 4A, there is shown a wireless bay module in its most basic form. Wireless bay activity module 51A includes a communication section 52 and a light indicator 53. If desired, wireless bay activity module 51 may include additional components such as display panels 55C and 55E.

If bay indicators 51A–51F are easily accessible to an operator (e.g. the operator utilizes a ladder or cherry picker as part of the operation) then such components as adjustment buttons 54 and service complete button 56 may optionally be included. Various forms of bay activity module 51 can have different configurations of light indicator 53, adjustment buttons 54, display panels 55C and 55D, and service complete button 56, similar to the various configurations described with respect to pick-to module 31 and pick-from modules 41. The above named parts would operate substantially the same as like named parts described in connection with FIGS. 2A–2G.

Using a bay indicator, such as bay indicator 51F in connection with a basic form of pick-from module, such as 41A or 41B of FIGS. 3A and 3B, could reduce the cost of the overall system by not requiring multiple display panels or other components at every bin in a bay. However, one tradeoff to saved cost would be an increased chance of operator error caused by not having the display information relating to the number of items picked right in front of the operator and may also increase confusion if more than one operator is picking from a location at the same time. As such, the use of a bay indicator (51 of FIG. 1) is completely optional.

Referring now to FIG. 5, there is shown a block diagram of a remote wireless device 70 in accordance with one embodiment of the present inventions. The remote wireless device 70, depending on the optional components chosen can be configured to be used as pick-to module 31, pick-from module 41 and/or bay indicator 51 of FIG. 1. In a preferred form of the inventive system, pick-to, pick-from and bay indicator modules all comprise the same physical form, but are programmed differently to perform their respective functions. Thus, in this preferred form, there is one basic type of module which is configurable so as to be used as a pick-to, pick-from, or bay activity module.

Still referring to FIG. 5, each remote wireless device used includes an antenna 71 to receive and/or transmit (if desired) information to the computer (20 of FIG. 1). Having its own wireless communication section with an antenna permits each wireless device to communicate individually with the computer without the information having to be decoded and translated by a processor panel wired to a plurality of devices in the bay. One advantage to a completely wireless set up, as taught herein, is that more frequently accessed bins may be rearranged on the shelves by moving a bin and its corresponding pick-from module without having to re-program or re-wire a processor panel to adjust to the change. In one particular embodiment of the present inventions the antenna and circuitry is chosen so as to receive and/or transmit signals in accordance with the BLUETOOTH standard of digital data transmission at 2.4 Ghz, spread spectrum.

Additionally, the remote wireless devices 70 of the present invention would include a translator 72. In receive only embodiments of the remote wireless device 70, translator 72 would "translate" or demodulate the incoming data transmissions, decode the data packets and transfer the data to the CPU 74. In embodiments that additionally return information from the remote wireless device 70, the translator 72 additionally encodes data received from the CPU 74, modulates and transmits the data to the computer 20, via the antenna 71. Using existing chips which implement the BLUETOOTH standard and an appropriate amplifier, it has been found that the range for the remote wireless device is 100 meters. The translator 72, may be chosen to be incorporated into a single chip, such as the Ericsson BLUETOOTH Module (part number ROK 101 007) made to translate data sent in accordance with the BLUETOOTH standard. The Ericsson BLUETOOTH Module is described herein more fully with respect to FIG. 6.

The current BLUETOOTH standard is version 1.0B, dated Nov. 29, 1999. That specification is incorporated herein by reference. To briefly summarize, BLUETOOTH, BLUETOOTH is a short-range radio link intended to replace the cable(s) connecting portable and/or fixed electronic devices. Key features are robustness, low complexity, low power, and low cost. A system using BLUETOOTH operates in the unlicensed ISM band at 2.4 GHz. A frequency hop transceiver is applied to combat interference and fading. A shaped, binary FM modulation is applied to minimize transceiver complexity. The symbol rate is 1 MS/s. A slotted channel is applied with a nominal slot length of 625 microsecons. For full duplex transmission, a Time-Division Duplex scheme is used. On the channel, information is exchanged through packets. Each packet is transmitted on a different hop frequency. A packet nominally covers a single slot, but can be extended to cover up to five slots. The BLUETOOTH protocol uses a combination of circuit and packet switching. Slots can be reserved for synchronous packets. BLUETOOTH can support an asynchronous voice. Each voice channel supports a 63 kb/s synchronous (voice) channel in each direction. The asynchronous channel can support maximal 732.2 kb/s asymmetric (and still up to 57.6 kb/s in the return direction), or 433.9 kb/s symmetric.

The CPU 74 receives the data from the translator 72 and operates on the data in accordance with instructions stored in the memory 75. The CPU 74 additionally receives inputs from the optional input devices which are chosen, such as the service complete button 77, the proximity sensing section 78, adjustment buttons 79A and 79B, and the microphone 80 (via the analog to digital converter 82). Similarly, CPU 74 provides the data signals to whichever output devices are chosen, such as light indicator 80, display panel 76 and speaker 84 (via digital to analog converter 83). CPU 74 may be a processor, such as is made by MOTOROLA. Additionally, each remote wireless device 70 is assigned a unique address so that the CPU can identify information directed specifically to the remote wireless device. This unique address may be stored in memory 75 or may be set using dip switches or other means in communication with the processor and/or translator. Particularly, the unique address may be implemented within a separate chip which implements the translator circuitry, such as the Ericsson Bluetooth module as described below with respect to FIG. 6.

Alternately, the CPU 74 and memory 75 can be configured to receive, store, and process information for multiple services, serving as a back-up to computer 20, thereby eliminating the need to communicate with computer 20 after each service. Thus, servicing can continue even if communication with computer 20 is interrupted. Further, if desired, information can be stored and processed locally on the remote wireless devices 70 as an alternative—not just as a back up—to processing by computer 20.

Proximity sensing section 78 may be any proximity sensing circuit known in the art. For example, proximity sensing section 78 may include an optical sensor or may be triggered by an RFID tag worn on the wrist of the operator. Other proximity sensors may be used. Proximity sensing section 78 may be integral to wireless device 70, or may be a stand-alone module which connects externally to wireless device 70. An external stand-alone module may be preferred in some instances: For example, wireless device 70 might be oriented so as to maximize visibility of any displays or indicators, although such orientation might be less than ideal for operation of proximity sensing section 78. In such a case, an externally connected stand-alone proximity sensing module can be oriented independently of the orientation of wireless device 70. A preferred embodiment includes a proximity sensing section 78 that comprises an infrared Light Emitting Diode (LED) configured to generate light pulses, an infrared phototransistor configured to detect reflected light pulses, and a microprocessor (hereinafter referred to as the proximity sensing microprocessor) configured to control the light pulse modulation of the LED and process the output of the phototransistor. (The sensors and circuitry comprising proximity sensing section 78 may also be collectively referred to as a "proximity switch"). In a preferred embodiment, the proximity sensing microprocessor controls the modulation of a 940 nanometer LED which is pulsed with a period of 43 microseconds, a pulse width of 20 microseconds, and a preset (user configurable) current of 40 to 500 milliamps. In this preferred embodiment, the phototransistor is mounted behind an infrared transparent plastic 940 nanometer filter, and is mounted parallel to and within 0.3 inches (center-to-center) of the LED.

The proximity sensing section may be configured such that there is a constant returned reflected signal (e.g. part of the light pulse reflects off, for example, the opposite side of a container on which the pick-from module is mounted) which changes (increases or decreases) in magnitude when a hand or other object is moved into the reflected signal's path, thereby triggering a change in the output state of an I/O pin connected (and preferably buffered through optical isolation circuitry) to CPU 74. (The state change of this I/O pin will hereinafter be referred to as the "proximity detection signal"). The proximity detection signal may be used instead of or in addition to a task complete button 77. Alternately CPU 74 can be configured to process the proximity detection signal as a counter or indexer (i.e. to determine an actual count of items picked, items put, etc.) thereby supplanting or obviating count adjustment buttons 79A and 79B (if any).

The return IR signal may be periodically measured (e.g. every ten milliseconds), and compared to a reference floor (or "baseline" or "background") signal stored in memory; if the difference exceeds a threshold magnitude, proximity sensing microprocessor activates the proximity detection signal for a finite time period (e.g. 300 milliseconds). The threshold magnitude for detection may be a predetermined threshold, or may be determined dynamically; e.g. the threshold magnitude could change as the baseline signal (or any other measured parameter) changes. Alternately the proximity sensing section may be configured such that there is no returned reflected signal in normal operation, and the detection of a returned signal exceeding a threshold (indicating, for example, that a hand or other object has reflected the light pulse back to the phototransistor) triggers the proximity detection signal.

Further, multiple LEDs and/or multiple phototransistors can be used to increase the physical range of sensing, increase the accuracy of sensing, etc. In a preferred embodiment, the proximity sensing microprocessor includes a multi-channel multiplexed analog-to-digital (A/D) converter and four or more digital input/output (I/O) lines, allowing for up to four LEDs and up to four phototransistors. In a preferred embodiment, the proximity sensing sections also includes amplifier circuitry (preferably high gain, low noise circuitry) and signal processing circuitry for conditioning the output of the phototransistor(s). In a preferred embodiment, the so-conditioned analog output of the phototransistor(s) is converted to an eight bit digital signal—corresponding to the amount of IR energy received by the phototransistor—by the microprocessor's A/D converter.

Light indicator 80 can be an incandescent bulb or can comprise multiple LEDs of the same or different colors. In a system using multiple LEDs of different colors, two operators can distinguish orders designated for them by matching a color combination, blinking sequence, or number of LEDs on light indicator 80 on a pick-to module to a similarly configured light indicator 80 on a pick-from module.

The display panel(s) 76 may display all or portions of various information. As described above, the display panel (s) 76 is/are preferably an LCD display or a multi-digit LED display panel. In one particular preferred embodiment, the display panel 76 is a color LCD display of the super twisted-nematic type. Optionally, the display may be a touch sensitive display and, if desired, the functionality of the adjustment buttons 79A and 79B and/or service complete button 77 may be incorporated into the touch sensitive display.

The remote wireless device 70 is powered by a power supply 73. The power supply 73 may incorporate one or more of a number of different power sources. For example, the power supply 73 may be a battery, such as an alkaline battery or a rechargeable lithium-ion/polymer battery. Additionally an external power port may be provided to power the device and/or recharge a rechargeable battery (if used). Further, power supply 73 may include one or more solar cells to further trickle-charge the battery. Inclusion of such solar cells would serve to prolong the utility of pick-from modules and bay indicators out in the warehouse. To further preserve battery life, the remote wireless devices 70 may include circuitry that would put the device 70 into a "sleep mode" having low power consumption if no instructions have been received by the device after a certain period of time or after actuation of a service complete button on the device. Additionally, if the remote wireless device includes transmit circuitry, circuitry could be included to detect a low or damaged battery, and transmit that information back to the computer 20 which can be reported to a dispatcher.

The remote wireless device 70 is housed in an external case (not shown) chosen so as to withstand industrial abuse. In a preferred embodiment, the external case is chosen to be mounted directly to any storage location or pick-to container.

It is important to note that some remote devices may be programmed to retransmit information to other remote wireless devices in the system. For example, bay activity module 51 could be configured to receive and retransmit information transmitted to and from pick-from modules 41. In such forms, bay activity module 51 can be configured for relatively high power communications, whereas pick-from module 41 can be configured for relatively lower power communication, potentially allowing reduced cost and power consumption for pick-from module 41, and potentially reducing communication interference with other modules or other RF sources.

Figure 6:
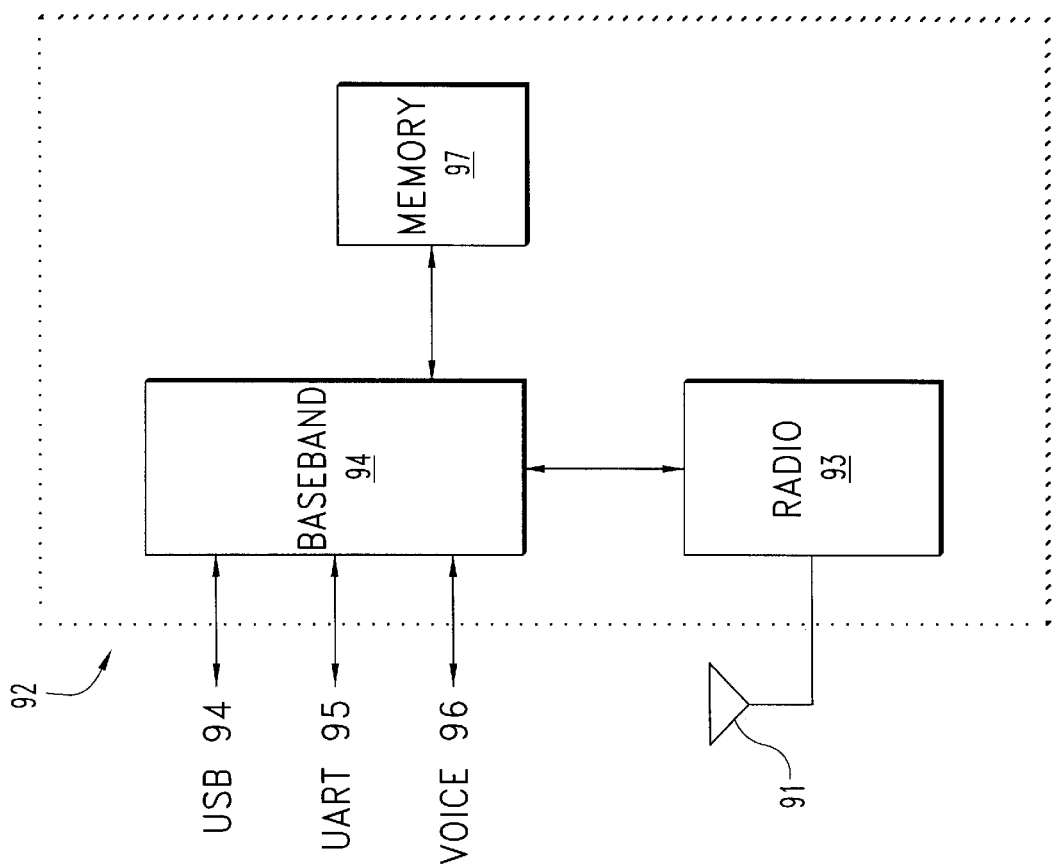
FIG. 6 is a block diagram of a translator device useful with the present inventions.

Referring now to FIG. 6, there is shown a simplified block diagram 92 of the Ericsson BLUETOOTH module, which may be chosen in one particular embodiment, to implement the functionality of translator 72 (of FIG. 5) as described above. Radio module 93 implements radio functionality according to the BLUETOOTH Radio PBA, and provides both transmit and receive capability. Radio module 93 interfaces to an antenna 91. Baseband controller 94 interfaces radio module 93 to an external processor (e.g. CPU 74 of FIG. 5) using a Universal Serial Bus (USB) interface 94 or a Universal Asynchronous Receiver/Transmitter (UART) interface 95. Baseband controller also includes a Pulse Code Modulation (PCM) Voice interface 96. Thus, forms of the invention using the Ericsson BLUETOOTH module may interface microphone 81 and speaker 84 (of FIG. 5) to baseband controller 94 through PCM Voice interface 96, rather than to CPU 74 as shown in FIG. 5. Baseband controller 94 also interfaces to flash memory 97. Flash memory 97 includes various firmware such as a Host Control Interface which handles communication through the USB or UART with the host (e.g. CPU 74 of FIG. 5).

Figure 7:
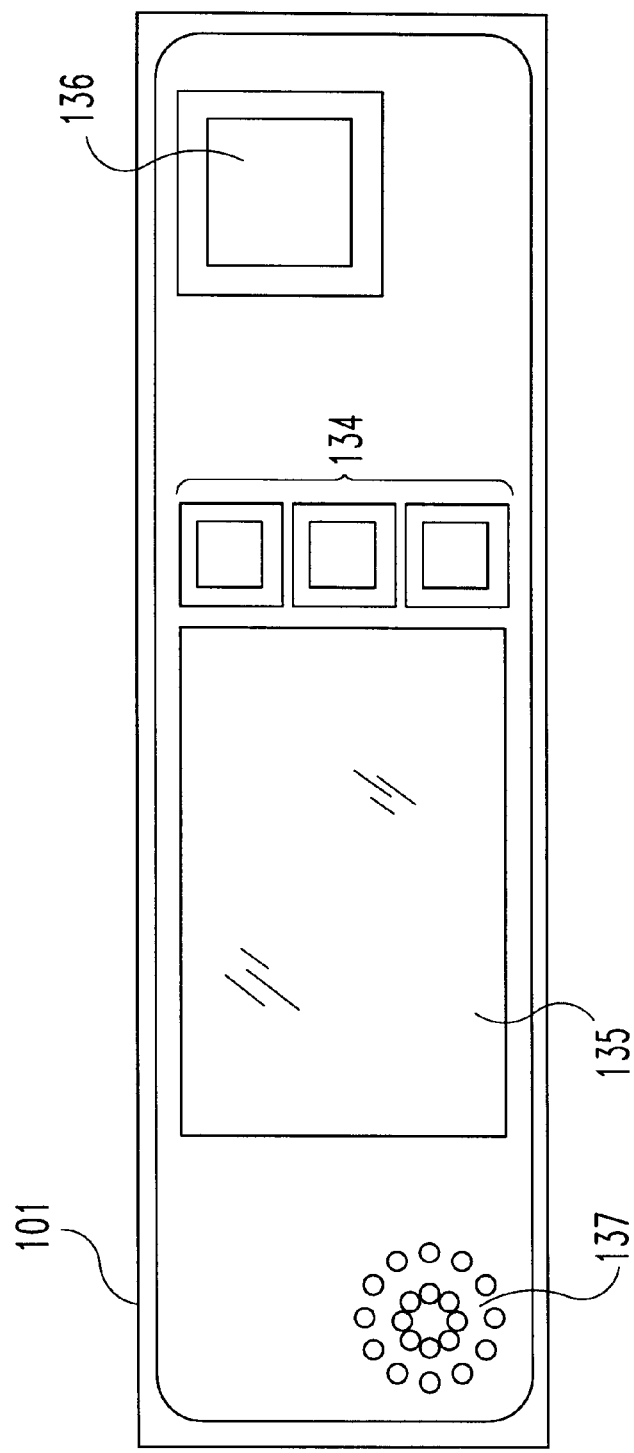
FIG. 7 shows a front elevation of a preferred embodiment of a wireless device in accordance with the present inventions, suitable for use as a pick-to, pick-from, or bay activity module.

Referring now to FIG. 7, there is shown a preferred embodiment of a wireless module 101 which comprises adjustment buttons 134, display 135, task complete button 136, and microphone 137. Wireless module 101 is configurable as a pick-to, pick-from, or bay activity module depending on differences in internal configuration as described above with reference to similar inventive wireless modules shown in FIGS. 1–4F. Likewise, the function of adjustment buttons 134, display 135, task complete button 136, and microphone 137 are as described above with respect to similarly named components of FIGS. 1–4F.

Referring back to FIGS. 1–4F, there will be given an example of the operation of one embodiment of the directed inventory system of the present inventions. In the present embodiment, information relating to an order to be serviced is entered into the computer. The computer 20, includes software to communicate with the remote wireless devices (i.e. pick-to device 31, pick-from device 41 and bay indicator 51). In one particular embodiment using a PC as computer 20, the software used to communicate with the remote wireless devices includes MICROSOFT Active X Control drivers with parent commands. Upon determining that an order has the next priority, the computer 20 provides the data relating to the order to the communication section 22 for transmission. The communication section 22 may include a translator chip similar to that of translator (72 of FIG. 5) of the remote wireless devices and an antenna. Optionally, if the computer is located distantly from the remote wireless devices, an access point module 61 may be supplied to receive, amplify, and retransmit the signal. Alternatively, if a remote access point module 61 is used, the data may be re-sent to the remote access point module 61 via a LAN connection to the host PC. In such a case, the remote access point module 61 would additionally include an antenna, a translator and a CPU and memory, such as those described in connection with the remote wireless device 70 of FIG. 5.

In the present embodiment, the data transmitted by the communication section 22 and/or access point module 61 is processed by the particularly addressed remote wireless devices. For example, the computer 22 would generate a packet of data for the wireless pick-to module 31, a packet of data for the wireless pick-from module 41, and a packet for the wireless bay activity module 51. The transmitted information can include a quantity to be picked, an SKU number indicating an associated parts bin, a location of a parts bin within the bay (e.g. shelf number, right side of bay, left side of bay, etc.), an operator designation, or other servicing information.

Note that the data sent to the pick-to module 31 may be different from that sent to the pick-from module 41 and/or the bay activity module 51. Similarly, if desired, all three remote wireless devices may receive different data for display. This is, in part, governed by the different configurations chosen for the remote wireless devices used. Alternatively, bay activity module 51 and pick-to module 31 and/or pick-from module 41 can all receive similar information (e.g. information corresponding to quantity, picking container designation, and operator designation), but display different subsets of the received information, as determined by differences in internal configuration and/or by additional information in the transmitted signal.

For example, a wireless pick-to module, such as shown in FIG. 2E, may display an order number on display panel 35C and a bay number on display panel 35E. The operator would proceed to the indicated bay number where a bay activity module, such as the bay activity module 51E shown in FIG. 4E, may include the order number on display panel 55C and a bin number on display panel 55E. After confirming that the order number on the pick-to module 31E display panel 35C corresponded to the order number on the bay activity module display panel 55C, the operator would look for the bin or shelf number indicated. Upon finding the correct bin having its indicator light on, the operator confirms the bin number by cross-checking the bin number on the bay activity module display panel 55E with that on the pick-from module display panel 45E. The operator then picks the number of items displayed on pick-from module display panel 45C. The use of different information on different devices can have multiple benefits. The present example, would cut down on the amount of confusion suffered by multiple operators picking from the same bays in a warehouse by linking the indicators to order number.

It can be understood how the various remote wireless devices of FIGS. 2, 3 and 4 could be interchanged to create a variety of efficient directed inventory systems while maintaining a minimum of cost.

In another example of the operation of the directed inventory system of FIG. 1, a wireless pick-to module 31G of FIG. 2G may be used in combination with a bay activity module 51A of FIG. 4A and a pick-from module 41A of FIG. 3A. In such an example, all information necessary to complete the service is sent to the operator on display panel 35F. For example, bay number and number of items to pick may be displayed, although other similar information (i.e. bin number and number of items) could be displayed with the same result. Thus a single line item task is displayed to the operator at a time.

The computer 20 would send the information in a packet or packets addressed to the particular pick-to module 31G, while substantially simultaneously sending packets addressed to pick-from module 41A and bay activity module 51A, informing those units to turn on the light indicators 43 and 53, respectively. The operator would proceed to the area of the bay indicated on the pick-to module display panel 35F and be visually guided to the desired bay by light indicator 53. The operator would then visually scan the bay until locating the bin in which the pick-from module 41A light indicator 43 was lit. The operator would then pick the number of items from the bin indicated on the display 35F. If fewer or greater number of items were picked, the operator would use the soft adjustment buttons 34F on the touch display to indicate the accurate number of items picked. After picking the items and adjusting the picked count, if necessary, the operator pushes the soft service complete button 36F to indicate that the task is complete. The information is processed and transmitted back to the computer 20 for inventory purposes. Further, pressing the service complete button may clear the pick-from module display registers and/or put the module into "sleep mode". The computer prepares and transmits (via the communication section 22 and/or access point module(s) 61) the data relating to the next task. If aural information need be sent to or from a dispatcher, microphone 37 and/or speaker 38 may be used. Otherwise, the operator repeats the above steps until the service is completed. It can also be seen from this example that the bay activity indicator may be optionally omitted without causing great delay in the operation.

Similarly, if the wireless pick-to module 31A of FIG. 2A, the bay activity indicator 51A of FIG. 4A and the wireless pick-from module 41F of FIG. 3F are used, then the operator would be alerted to a service to be performed by the indicator 33 of the pick-to module 31A being lit. The operator would visually scan the bay activity modules until locating the lit bay activity module 51A light indicator 53. After proceeding to the bay, the operator visually scans the bay to locate the lit pick-from module 41F indicator 43. Note that in such an instance, the information on display panel 45E may be omitted as unnecessary. The operator proceeds to pick the number of items listed on display panel 45C. Once picking is initiated, the optional proximity sensing section may relay data to the computer 20 stating that a picking operation has begun at a the pick-from module of a particular address. Additionally, the information from the proximity sensing section can be used for inventory purposes, and can replace, if desired, the adjustment buttons 44. Once the service is complete, the operator may hit the service completed button to indicate to the computer 20 that the task is over. Alternately, if a predetermined amount of time has passed since a last proximity sensed picking operation, the module can send a signal to the computer that the picking operation is over without the operator having to push a service complete button.

In another example of the operation of the inventions of FIGS. 1–4F, a bay activity module may take the form of bay activity module 4C, with display 55C indicating the bin or shelf number. A pick-from module, such as pick from module 41C of FIG. 3C may be chosen, wherein the data on the display 45C is the number of items to be picked. An operator is alerted to a service to be performed by a pick-to module, such as pick-to module 31B of FIG. 3B or 31D of FIG. 3D. The operator visually scans the bays until locating the appropriate bay having the lit light indicator 53. The operator notes the bin number and then locates the indicated bin using both the bin number and the light indicator 43 of the pick-from module 41C. The operator picks the number of items indicated on the display 45C of the pick-from module 41C. Upon completion of the task, the operator pushes the task complete (or "service complete") button 36 on the pick-to module 31B (and/or adjusts the number picked using adjustment buttons 34 of module 31D), thus transmitting a task complete signal to the computer 20. It can be seen that in such an example that cost could be reduced by having bay activity modules and pick-from modules that are receive only, while equipping the operator with a single wireless pick-to module that is receive/transmit capable.

Inventory systems according to the present invention can also be used for put operations. A put operation is a typical way of redistributing goods from a central location (e.g. a warehouse) to other locations (e.g. various retail stores, various departments within a retail store, etc.). In effect, a basic put operation is a "one-to-many" operation whereas a basic pick operation is "many-to-one". Thus in some respects, a put operation can be considered a "reverse" pick. Accordingly, many of the aforementioned systems using inventive wireless modules described with respect to picking operations can be suitably used for putting operations using the same types of inventive wireless modules.

In an example of a "put" operation of the inventions of FIGS. 1–4, a wireless module, such as module 31G of FIG. 2G is attached to a carton of parts which are to be re-distributed to one or more bins. Data displayed on Display 35F indicates to an operator a quantity of parts to be put, and which bin the parts are to be put into. The operator scans the displayed information, puts the specified number of parts into the specified bin, and presses a task complete button (e.g. button 36F of FIG. 2G). A wireless module such as module 41C of FIG. 3C could also be attached to each bin thus providing additional visual feedback to the operator, by displaying indicia on display 45C and/or indicator 43.

In another example of the operation of the inventions of FIGS. Xyz, a wireless module is attached to a part to be processed on an assembly line. A pick-to module, such as pick-to module 31G of FIG. 2G may be chosen, wherein the data on the display 35F are processing and/or routing instructions to an assembly line worker. Audio information can be reproduced on speaker 37 instead of or in addition to any displayed data. The assembly line worker reads instructions from display 45C (and/or listens to audio instructions from speaker 37) and performs the processing and/or re-routing of the part as specified. Upon completion, the operator pushes the task complete (or "service complete") button 36F on the pick-to module 31G, thus transmitting a task complete signal to the computer 20 which, if necessary, transmits new information to the module to instruct the next worker on the assembly line.

In the above example, a wireless module (such as module 31B of FIG. 2B) could also be carried by (e.g. clipped to the clothing of, strapped to the wrist of, etc.) the assembly line worker. Indicator 33 can display indicia to alert the operator that a part he is to service or re-route is approaching on the assembly line. A speaker (not shown) can also similarly alert the operator. The operator can press task complete button 36 on the module he carries; in some circumstances this button will be easier for the operator to press rather than a button on a module which is moving on a conveyor. For instance, if the operator's task involves extensive use of hand tools, he may not have time to perform the task, free his hands, and push a button while the part is still within reach.

To continue the example, if the operator does not press a task complete button (e.g. the task was not completed) computer 20 can detect this by a time-out operation (based on a fixed timing interval, a time interval which is based on the particular task, an interval based on an actual (sensed) or pre-programmed speed of the assembly line, an interval based on distance between stations on the line, etc.) and store information indicating that the particular task may not have been performed. In such a case, if the assembly process requires that tasks be performed in order, computer 20 can transmit information to module 41 directing subsequent operators on the assembly to ignore the part or offload it from the assembly line for later processing. If tasks do not have to be performed in order, computer 20 can transmit information to module 41 directing subsequent operators to perform tasks as normal, and at a designated subsequent location on the line (e.g. a quality monitoring station, a station at the end of the assembly line, etc.) computer 20 can transmit information directing an operator at the designated location to physically redirect the part back to the station where the task had not been completed. In a system not employing inventive wireless modules, quality assurance personnel would have to physically inspect a part to determine if tasks had not been performed, and, if so, which station a non-performed task is associated with; such inspection is time consuming and potentially inaccurate.

The above examples are not meant to be limiting. Rather they are meant to be illustrative of the capabilities of the wireless directed inventory system of the present inventions using various combinations of pick-to modules, pick-from modules and bay indicators, all having various features, functions and capabilities. Thus, from the above description and examples, it can be seen how to choose remote wireless devices having complimentary features to optimize a directed inventory system by increasing efficiency and reducing cost.

In an alternate embodiment (not shown), pick-to modules 31, as described in connection with the embodiment of FIGS. 1 and 2A–2G, may be used as an addition to a conventional paper or wired directed inventory system. For example, an existing conventional inventory system using non-wireless pick-from modules could be advantageously upgraded by adding one or more inventive wireless pick-to modules, thereby striking a trade-off between the flexibility of a fully wireless system, and the higher costs of replacing or retrofitting existing pick-from modules.

Similarly, another alternate embodiment (not shown), is a system having no "pick-from" modules, but including a pick-to module as described in connection with FIG. 1. In such a system, it would be advantageous to replace a prior art paper picking list with a pick-to device such as is shown in FIGS. 2B, 2F and 2G, thus eliminating the human error and inaccuracies in using a paper picking list. In such a system, the pick-to module 31 would be carried by the operator, who would be alerted to the location and number of desired items. After picking the desired number of items, the operator would push the service complete button 36 and be informed of the next location and number of items on the list. This system would eliminate the visual line item crossover errors inherent with the paper list system, without incurring the cost to install pick-from modules adjacent a plurality of bays, bins and carousels.

Additionally, if desired the wireless directed inventory system of FIG. 1 may be implemented without the pick-to modules 31. Such a system would maintain the advantages of the wireless pick-from modules 41 and wireless bay activity modules. In such a system, the operator would be scan for a bay activity indicator light, and complete the service indicated on either the bay activity module or the pick-from module.

Although the present invention has been described with reference to various embodiments described herein, those skilled in the art will recognize that changes may be made in form and detail without departing from the spirit and scope of the invention. For example, although, various specific configurations have been shown in connection with FIGS. 2–4 relating to the pick-to, pick-for and bay indicator modules, other configurations are possible using the described components. For example, additional display portions may be added or programmed to display more than the two pieces of information discussed in connection with the above embodiments (i.e. order number, bin number, product SKU number and number to be picked may be simultaneously displayed on a remote wireless device). Also, chips other than the Ericsson BLUETOOTH module, may be chosen to implement all or some of the translator and other communications functionality as described herein.

What is claimed is:

1. A directed inventory system, comprising:
    a computer operable to process servicing information;
    a plurality parts bins;
    a plurality of pick-from module each being associated with and positioned proximal to individual ones of the parts bins, each of the pick-from modules being operable to directly wirelessly communicate with the computer to allow easy positional rearrangement of the parts bins, wherein every one of the pick-from modules each separately include
        an antenna operable to receive a wireless communication directly from the computer,
        a translator operatively coupled to the antenna to demodulate the wireless communication from the computer,
        a processor operatively coupled to the translator to process the wireless communication, and
        a light indicator operatively coupled to the processor to visually identify a selected one of the parts bins in response to the wireless communication from the computer;
    at least one access-point module operable to receive and retransmit the wireless communication between the computer and the pick-from modules;
    wherein the access-point module is operable to decode virtual addresses for the pick-from modules to increase number of addresses available in the directed inventory system; and
    wherein at least one of the pick-from modules includes a proximity detection section operatively coupled to the processor of the at least one of the pick-from modules, the proximity detection section being operable to sense activity around at least one of the parts bins to count parts movement.

2. The directed inventory system of claim 1, wherein the proximity detection system includes a light emitting diode operable to generate light pulses for detecting the activity.

3. The directed inventory system of claim 1, wherein the pick-from modules are detachably coupled to the parts bins.

4. The directed inventory system of claim 1, further comprising a pick-to module associated with and positioned proximal to an operator, the pick-to module being operable to directly wirelessly communicate with the computer to alert the operator of a servicing task.

5. The directed inventory system of claim 4, further comprising a bay activity module operable to wirelessly communicate with the computer to identify a bay containing selected ones of the parts bins for the servicing task.

6. A directed inventory system, comprising:
    a computer operable to process servicing information;
    a plurality parts bins; and
    a plurality of pick-from module each being associated with and positioned proximal to individual ones of the parts bins, each of the pick-from modules being operable to directly wirelessly communicate with the computer to allow easy positional rearrangement of the parts bins, wherein every one of the pick-from modules each separately include
        an antenna operable to receive a wireless communication directly from the computer,
        a translator operatively coupled to the antenna to demodulate the wireless communication from the computer,
        a processor operatively coupled to the translator to process the wireless communication, and
        a light indicator operatively coupled to the processor to visually identify a selected one of the parts bins in response to the wireless communication from the computer; and wherein at least one of the pick-from modules includes a proximity detection section operatively coupled to the processor of the at least one of the pick-from modules, the proximity detection section being operable to sense activity around at least one of the parts bins to count parts movement.

7. The directed inventory system of claim 6, wherein the proximity detection system includes a light emitting diode operable to generate light pulses for detecting the activity.

8. The directed inventory system of claim 6, wherein the pick-from modules are detachably coupled to the parts bins.

9. The directed inventory system of claim 6, further comprising a pick-to module associated with and positioned proximal to an operator, the pick-to module being operable to directly wirelessly communicate with the computer to alert the operator of a servicing task.

10. The directed inventory system of claim 9, further comprising a bay activity module operable to wirelessly communicate with the computer to identify a bay containing selected ones of the parts bins for the servicing task.

* * * * *